(12) United States Patent
Mimuro et al.

(10) Patent No.: US 7,047,912 B2
(45) Date of Patent: May 23, 2006

(54) WORK VEHICLE COOLING SYSTEM

(75) Inventors: Junji Mimuro, Sayama (JP); Shinichi Itou, Kawagoe (JP)

(73) Assignees: Komatsu Ltd., Tokyo (JP); Komatsu Zenoah Co., Kawagoe (JP)

( * ) Notice: Subject to any disclaimer, the term of this patent is extended or adjusted under 35 U.S.C. 154(b) by 0 days.

(21) Appl. No.: 10/683,281

(22) Filed: Oct. 14, 2003

(65) Prior Publication Data

US 2004/0074454 A1    Apr. 22, 2004

(30) Foreign Application Priority Data

Oct. 16, 2002  (JP)  ............................. 2002-301264

(51) Int. Cl.
*F01P 7/10*    (2006.01)
*F01P 11/08*   (2006.01)

(52) U.S. Cl. .................................. 123/41.33; 123/41.49

(58) Field of Classification Search ............. 123/41.33, 123/41.49, 41.48, 41.65, 41.7; 180/68.1, 180/68.2, 68.4; 165/41
See application file for complete search history.

(56) References Cited

U.S. PATENT DOCUMENTS

| | | | |
|---|---|---|---|
| 4,304,314 A | 12/1981 | Sakaguchi et al. | |
| 4,546,696 A | 10/1985 | Fogg | |
| 4,874,036 A | 10/1989 | Masuda | |
| 5,143,516 A * | 9/1992 | Christensen | 415/182.1 |
| 5,816,351 A * | 10/1998 | Akira et al. | 180/68.1 |
| 6,405,825 B1 * | 6/2002 | Yabe et al. | 181/204 |
| 6,431,299 B1 * | 8/2002 | Asche et al. | 180/68.1 |
| 6,615,942 B1 * | 9/2003 | Shinohara et al. | 180/69.21 |

FOREIGN PATENT DOCUMENTS

| | | |
|---|---|---|
| DE | 1580826 A1 | 11/1971 |
| GB | 1259993 | 12/1972 |
| JP | 58-65123 | 5/1983 |
| JP | 08-151660 A | 6/1996 |
| JP | 8-240653 A | 9/1996 |
| JP | 09-095973 A | 4/1997 |
| JP | 09-158251 A | 6/1997 |
| JP | 9-247730 A | 9/1997 |
| JP | 09-268597 A | 10/1997 |
| JP | 10-104336 A | 4/1998 |
| JP | 10-241095 A | 9/1998 |
| JP | 10-312500 A | 11/1998 |
| JP | 11-007599 A | 1/1999 |
| JP | 11-081378 A | 3/1999 |
| JP | 2002-061222 A | 2/2002 |

\* cited by examiner

*Primary Examiner*—Henry C. Yuen
*Assistant Examiner*—Hyder Ali
(74) *Attorney, Agent, or Firm*—Posz Law Group, PLC; R. Eugene Varndell, Jr.

(57) ABSTRACT

A work vehicle cooling system comprises a cooling fan (18) driven by the output from an engine (16), and a flow path for allowing an airflow (27) generated by the cooling fan (18) to be flown between the engine (16) and an operator's seat (14) without having passed through any of a radiator (20) and an oil cooler (21) for the engine (16). With this simple configuration, the heat generated by the engine (16) is prevented from being transmitted to the operator's seat (14).

4 Claims, 4 Drawing Sheets

WORK VEHICLE COOLING SYSTEM

BACKGROUND OF THE INVENTION

1. Field of the Invention

The present invention relates to a cooling system for cooling an operator's seat of a work vehicle.

2. Related Art

There has been a known technique for preventing an operator's seat of a work vehicle from being heated by the heat from an engine as described, for example, in Utility Model Application Publication No. 58-65123.

FIG. 6 of Japanese Utility Model Application Publication No. 58-65123 illustrates the sectional side view of a work vehicle, in which a counter weight 91 provided at the rear side of a work vehicle has a path 92 through which cooling air passes. A cooling fan 18 sucks outside air through this path 92. Consequently, an airflow 93 of the outside air passes through a radiator 20, thereby cooling a cooling water running through the radiator 20.

The airflow 93, which is heated while passing through the radiator 20, is sent to an engine room 17. The airflow 93 is sucked by a blower 96 into a duct, and is then passed through an evaporator 94 for freezing cycles provided above the engine room 17.

The airflow sent in this way is cooled to be cold air 95A and 95B. The cold air 95A is blown to the rear part of the operator's seat 14 to prevent the operator's seat 14 from being heated. The cold air 95B is returned into the engine room 17 to cool the interior of the engine room 17.

However, the conventional technique disclosed in the Japanese Utility Model Application Publication No. 58-65123 has a problem as described below. Specifically, in this conventional technique, the entire airflow sucked from the outside is sent to the radiator 20 where it is heated and then cooled again by the evaporator 94. Thus, this re-cooling operation requires additional energy, causing an increased amount of energy consumption.

Moreover, the airflow heated by the radiator 20 is once sent to the engine room 17, and then sent to the evaporator 94 by a blower 96. This causes another problem in which the blower 96 is required to be provided, and a route is complicated through which the airflow runs. As a result, it is difficult to manufacture the cooling system.

SUMMARY OF THE INVENTION

The present invention is made in view of the above problems. It is an object of the present invention to provide a work vehicle cooling system which has a simple structure and a reduced amount of energy consumption.

It is another object of the present invention to provide a work vehicle cooling system in which an operator's seat receives a reduced heat from the heat generated by an engine.

In order to achieve the above objects, one aspect of the present invention provides a work vehicle cooling system comprising a cooling fan driven by the output from an engine, and a flow path for allowing an airflow generated by the cooling fan to be flown between the engine and an operator's seat without having passed-through any of a radiator and an oil cooler for the engine.

With this configuration of the a work vehicle cooling system, an airflow to be sent between the engine and the operator's seat has not passed through any of the radiator and the oil cooler, and therefore the airflow is heated by the radiator and the oil cooler. Thus, the heat from the engine is blocked by the airflow to prevent the operator's seat from being excessively heated.

Another aspect of the present invention provides a work vehicle cooling system in which a flow path comprises an air inlet provided between the operator's seat and at least one of the radiator and the oil cooler.

With this configuration, the operator's seat having a simple heat shield structure can be realized without providing an additional flow path.

Still another aspect of the present invention provides a work vehicle cooling system in which.

With this configuration while a cooling fan of discharge type allows the air in the engine room heated by the engine heat to go under the operator's seat, a cooling fan is of suction type allows the outside air having a low temperature to go under the operator's seat, whereby it is possible for the operator's seat to have a lower temperature.

BRIEF DESCRIPTION OF THE DRAWINGS

Embodiment of the present invention will be described in detail based on the following drawings, wherein.

DESCRIPTION OF EMBODIMENTS

Embodiment according to the present invention will be described in detail with reference to the accompanying drawings.

Figure 1:
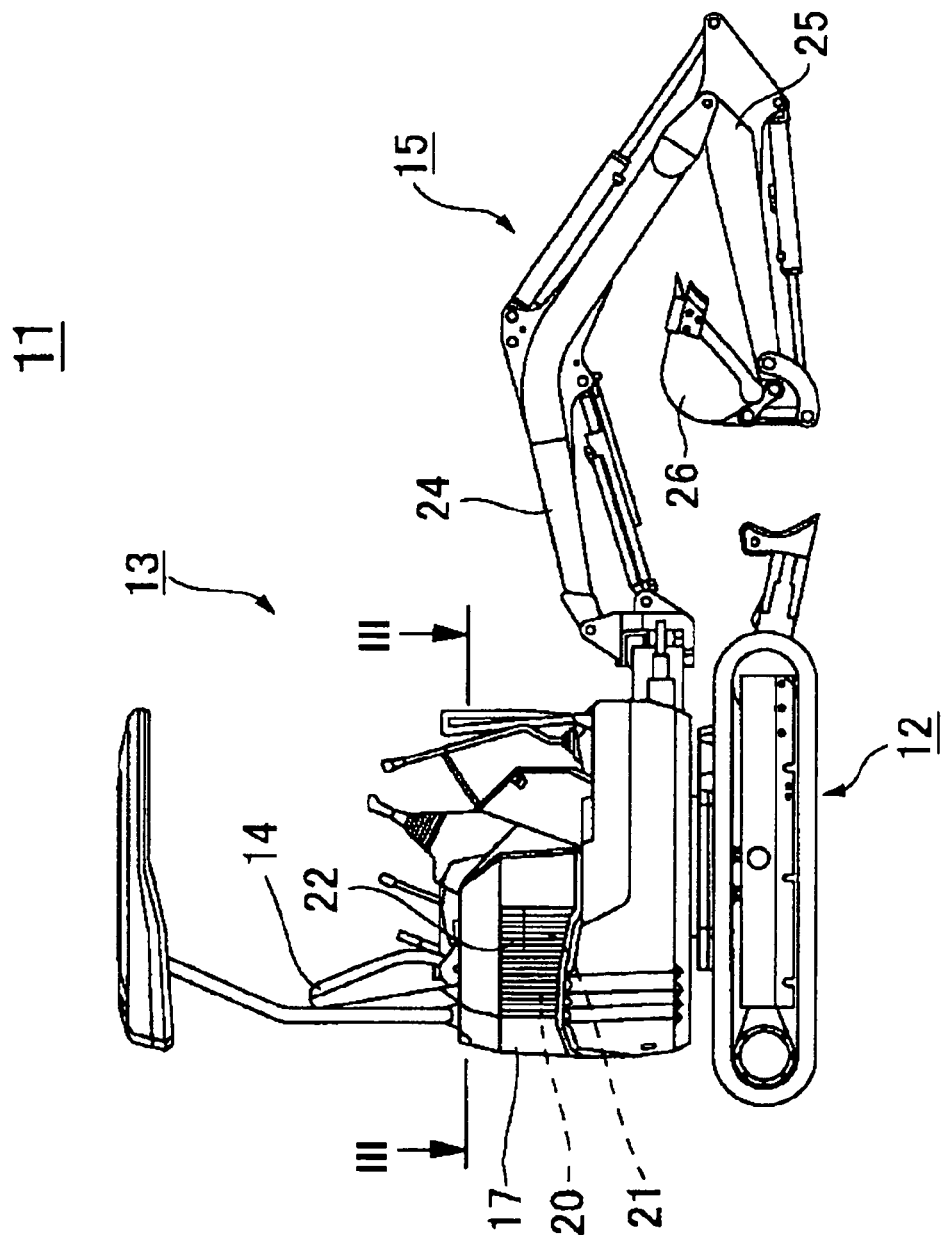
FIG. 1 illustrates a side view of a hydraulic excavator according to an embodiment of the present invention.
Figure 2:
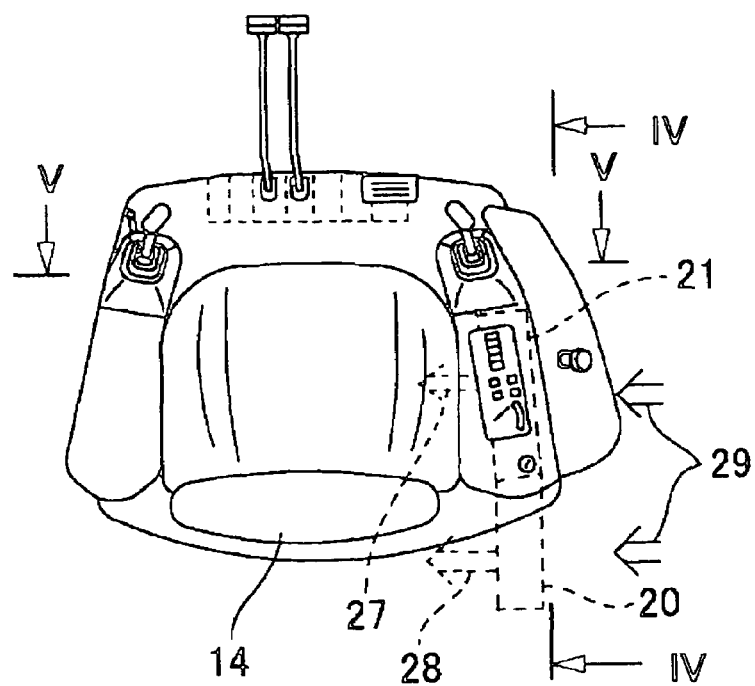
FIG. 2 illustrates a partial plain view of a swivel of the hydraulic excavator as shown in FIG. 1.

In FIG. 1, a hydraulic excavator 11 includes a travelling section 12, and a swivel 13 rotating in an arbitrary direction mounted on the travelling section 12. The swivel 13 has therein an operator's seat 14. In front of the operator's seat 14, a working machine 15 having arms 24 and 25 and a bucket 26 attached to the tip end of the arm 25 such that the working machine 15 can swing in an up-and-down direction in a vertical plane.

Figure 3:
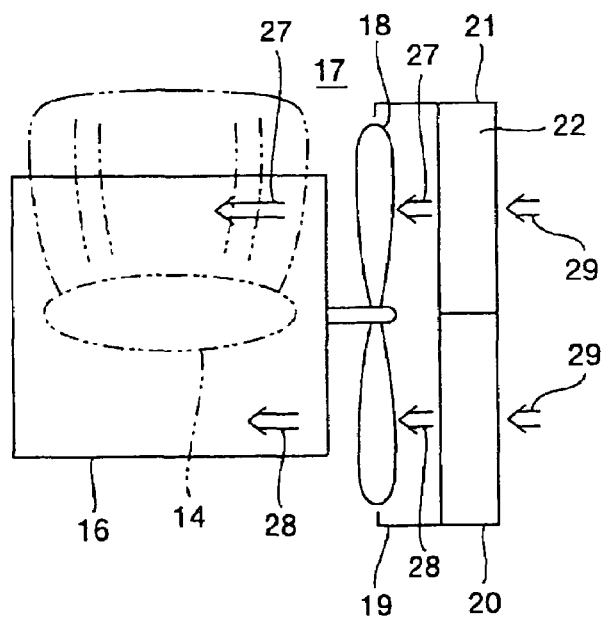
FIG. 3 is a schematic sectional plan view taken at a line III—III in FIG. 1.

The operator's seat 14 is provided above an engine room 17 enclosing an engine 16 as shown in FIGS. 1 and 3. The engine 16 has an output shaft directly connected with a suction-type cooling fan 18 so that the outside air can be sucked into the engine room 17. A shroud 19 having a circular opening is provided around the cooling fan 18.

A radiator 20 for cooling the cooling water and an oil cooler 21 for cooling engine oil for the engine 16 are provided side by side at the upstream side (outer side) of the cooling fan 18. The oil cooler 21 has a height lower than the height of the radiator 20. As bast shown in FIG. 4, an air inlet 22 through which air passes is formed in an upper side of the oil cooler 21.

As best shown in FIG. 3, when the engine 16 operates to allow the cooling fan 18 to rotate, the airflow 29 is generated. A part of the airflow 29 is sent through the radiator 20 and the oil cooler 21 to be sucked into the engine room 17.

Another part of the airflow 29 is sent through the air inlet 22 to be sucked into the engine room 17.

Airflow 28 is sent through the radiator 20 and the oil cooler 21, thereby cooling the cooling water passing through the radiator 20 and the operating oil passing through the oil cooler 21. This causes the airflow 28 to be heated to be a hot air having a high temperature.

On the other hand, an airflow 27, which is a part of the airflow 29 generated by the cooling fan 18, goes through the air inlet 22 to be directly sucked into the engine room 17 without passing through the radiator 20 and the oil cooler 21. This allows the airflow 27 to have a temperature that is lower than that of the airflow 28 and is substantially equal to that of the airflow 29 of outside air.

Figure 5:
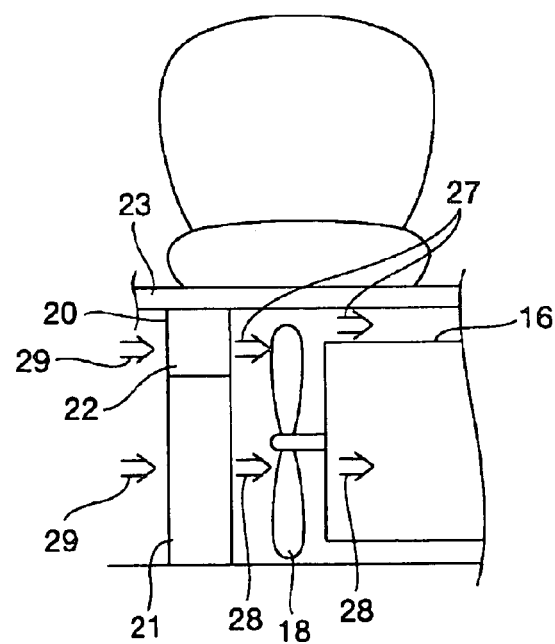
FIG. 5 is a schematic sectional front view taken at a line V—V in FIG. 2.
Figure 6:
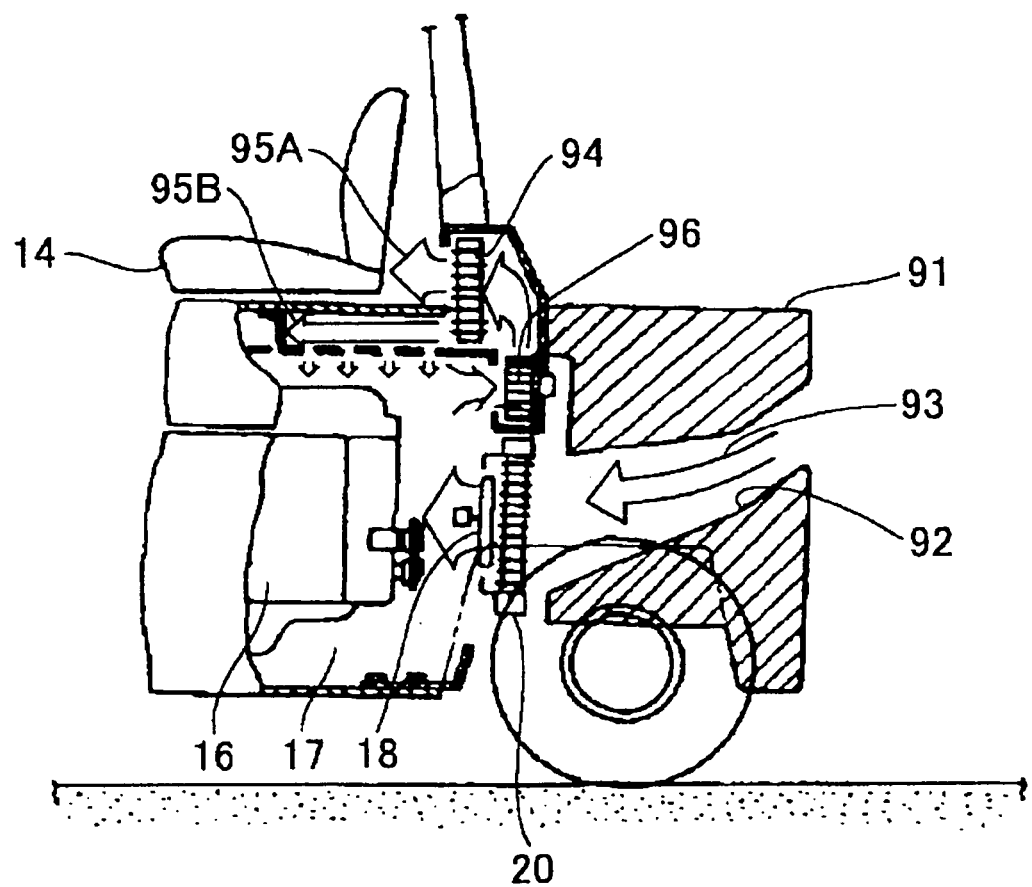
FIG. 6 illustrates a partial schematic sectional side view of a work vehicle according to a conventional technique.

As shown in FIG. 5, since the air inlet 22 is provided directly below the operator's seat 14, the airflow 27 having a low temperature goes directly under the operator's seat 14 in a substantially horizontal direction. The result is that the airflow 27 of a low temperature flows between the engine 16 and the operator's seat 14 like an air-curtain, thus preventing the heat of the engine 16 from being transmitted to the operator's seat 14 so that the operator's seat 14 is kept at a low temperature.

Figure 4:
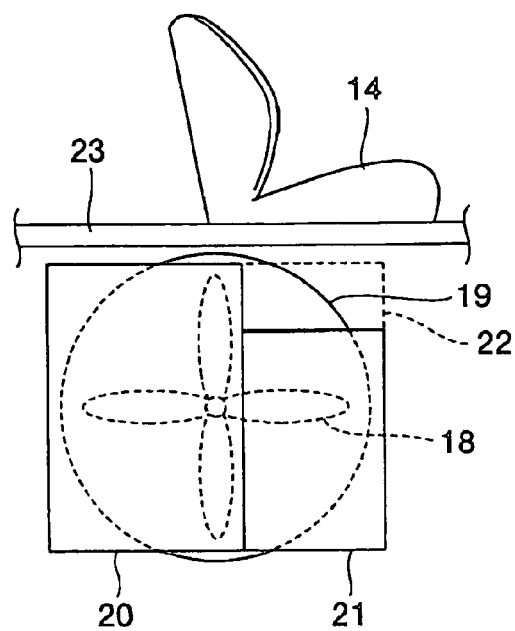
FIG. 4 is a schematic sectional side view taken at a line IV—IV in FIG. 2.

As shown in FIGS. 4 and 5, a vibration absorption material 23 is provided on the lower side of the operator's seat 14. This vibration absorption material 23 also has a heat insulation effect so that transmission of the heat of the engine 16 to the operator's seat 14 is further prevented.

This allows an operator sitting on the operator's seat 14 to comfortably perform an operation while feeling less discomfort caused by heat.

As described above, according to this embodiment of the present invention, the air inlet 22 is provided, which allows the airflow generated by the cooling fan 18 to go between the operator's seat 14 and the engine 16 without passing through the radiator 20 and the oil cooler 21. The result is that an air flow path is provided between the operator's seat 14 and the engine 16 through which the airflow 27 having a relatively low temperature passes without passing through the radiator 20 and the oil cooler 21. This airflow 27 blocks the heat from the engine 16, thereby preventing the operator's seat 14 from being heated and providing a comfortable operation.

It is noted that the embodiment described above is so configured that the operator's seat 14 is located above the engine 16. However, the present invention is not limited to this configuration. For example, the operator's seat 14 may be located in front of the engine 16. In this configuration, the cooling system may be constructed so that a part of the airflow 27 from the cooling fan 18 passes between the engine 16 and the operator's seat 14 without passing through the oil cooler 21 and the radiator 20.

Further, the embodiment described above is configured so that the cooling fan 18 is directly connected to the output shaft of the engine 16. However, the cooling fan 18 may be indirectly driven by the engine 16 via a belt, for example.

Furthermore, the embodiment described above is configured so that the air inlet 22 is provided above the oil cooler 21. However, the present invention is not limited to this configuration. For example, the air inlet 22 may be provided between the radiator 20 and the operator's seat 14 by allowing the radiator 20 to have a reduced height. Alternatively, the air inlet 22 may be provided above both the radiator 20 and the operator's seat 14. Further, the radiator 20 and/or the operator's seat 14 is formed with a notched portion, and the air inlet 22 may be provided in the notched portion.

The embodiment described above is configured so that the cooling fan 18 is of suction type. However, the present invention is not limited to this configuration. A cooling fan of discharge type may be employed. When the cooling fan 18 is of discharge type, the airflow discharged from the cooling fan 18 is sent, as in the suction type, in such a manner that a partial airflow 28 goes through the radiator 20 and the oil cooler 21 and another partial airflow 27 goes through the air inlet 22. This airflow 27 does not pass through the radiator 20 and the oil cooler 21 as in the above-described case and thus is not heated greatly.

With this configuration, the air inlet 22 has a smaller resistance and this allows a larger amount of the air of the airflow 27 passes through the air inlet 22 as compared with that of the airflow 28 passing through the radiator 20 and the oil cooler 21. As a result, a large amount of air for the airflow 27 passes between the engine 16 and the operator's seat 14 via the air inlet 22 so that the airflow 27 takes a form of an air curtain, which serves to prevent the heat from the engine 16 from being transmitted to the operator's seat 14. Thus, the operator enjoys a comfortable operation.

The above embodiment described a case in which the working machine 15 is provided such that it can swing in the left-and-right direction in a horizontal face. However, the present invention is not limited to such a configuration. Furthermore, the present invention is not limited to a hydraulic excavator and also may be applied to a small construction machine or a forklift.

What is claimed is:

1. A work vehicle cooling system, comprising:
   a cooling fan (18) driven by the output from an engine (16) of a work vehicle; and
   a flow path for allowing an airflow (27) generated by the cooling fan (18) to be directly sucked from outside of the work vehicle and a straight-line manner between the engine (16) and an operator's seat (14) without having passed through any of a radiator (20) and an oil cooler (21),
   wherein in the airflow (27) flowing upstream toward downstream, the radiator (20) and the oil cooler (21), the cooling fan (18), and the engine (16) are arranged in the named order.

2. A work vehicle cooling system comprising:
   a cooling fan (18) driven by the output from an engine (16) of a work vehicle;
   and a flow path for allowing an airflow (27) generated by the cooling fan (18) to be directly sucked from outside of the work vehicle and a straight-line manner between the engine (16) and an operator's seat (14) without having passed through any of a radiator (20) and an oil cooler (21),
   wherein the flow path comprises an air inlet (22) provided between the operator's seat (14) and at least one of the radiator (20) and the oil cooler (21).

3. A work vehicle cooling system according to claim 1, wherein the cooling fan (18) is of suction type, and
   the airflow (27) flowing between the engine (16) and the operator's seat (14) without having passed through any of the radiator (20) and the oil cooler (21) is sucked toward an engine room.

4. A work vehicle cooling system according to claim 2, wherein the cooling fan (18) is of suction type.

* * * * *